May 31, 1966     W. C. McCARTHY ET AL     3,254,135
METHOD FOR RESOLVING EMULSIONS
Filed Aug. 4, 1961
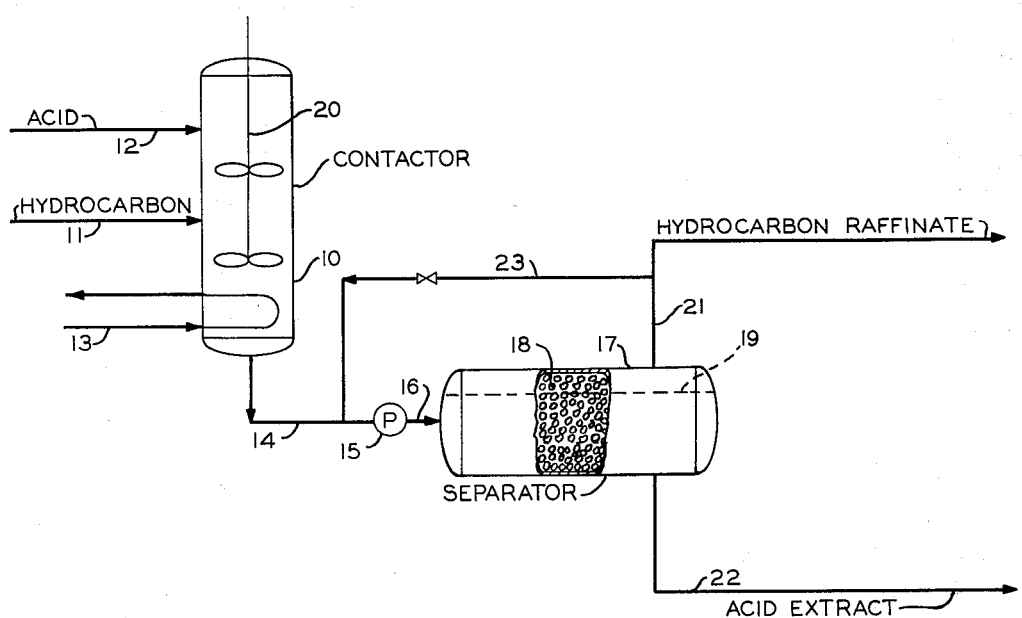
INVENTORS.
W. C. MCCARTHY
G. L. GLAHN
BY Hudson and Young
ATTORNEYS United States Patent Office 3,254,135
Patented May 31, 1966

3,254,135
METHOD FOR RESOLVING EMULSIONS
William C. McCarthy and Gerald L. Glahn, Bartlesville, Okla., assignors to Phillips Petroleum Company, a corporation of Delaware
Filed Aug. 4, 1961, Ser. No. 129,452
2 Claims. (Cl. 260—677)

This invention relates to the resolution of emulsions. In one aspect this invention relates to a method for effecting coalescence of minute droplets of a nonpolar liquid dispersed in a polar liquid. In another aspect this invention relates to a contact means for accelerating the coalescence of minute droplets of a nonpolar liquid dispersed in a polar liquid. In a more specific aspect this invention relates to the acceleration of coalescence of minute droplets of a liquid hydrocarbon dispersed in a sulfuric acid solution of tertiary amylenes and/or tertiary amyl alcohol.

Liquid solvents generally immiscible with liquid hydrocarbons are conventionally employed to extract, by absorption, specific hydrocarbon constituents from hydrocarbon mixtures. Intimate contact between the hydrocarbon and solvent phases is effected during the extraction step after which the mixture is allowed to separate into two immiscible liquid phases by reason of the difference in the densities of the two phases. In the step of intimately contacting the two immiscible liquids minute droplets of liquid are formed which tend to remain dispersed. Thus, it is difficult and under some conditions almost impossible to separate effectively the immiscible phases within a reasonable settling time. This is particularly true with respect to the liquid hydrocarbon with the result that the extract often contains an appreciable amount of the hydrocarbon raffinate suspended therein as a relatively stable emulsion.

In the extraction of tertiary amylenes, that is the amylenes derived from tertiary alcohols, i.e., 2-methylbutene-2 and 2-methylbutene-1, from a mixture of hydrocarbons containing said tertiary amylenes and other $C_5$ hydrocarbons, the mixture of hydrocarbons is intimately contacted with an aqueous sulfuric acid solution. It is then necessary to separate the hydrocarbon raffinate phase from the acid extract phase containing absorbed or dissolved therein the tertiary amylenes. Conventionally this is accomplished by passing the mixture of hydrocarbons and acid to a settling vessel wherein the sulfuric acid extract settles to the lower portion of the vessel and is withdrawn therefrom. It has heretofore been determined that the extraction of tertiary amylenes from a hydrocarbon mixture, using aqueous sulfuric acid as the extracting agent, is effective when the concentration of a 50–70 weight percent aqueous sulfuric acid in the contact zone is in the range of 40–70 volume percent of the total mixture. Under these conditions, the hydrocarbon and acid mixture passed from the contact zone to the settling zone is in the form of an emulsion of a nonpolar hydrocarbon phase dispersed in a continuous polar sulfuric acid phase.

Upon withdrawal of the sulfuric acid extract phase from the settling zone it has been observed that a portion of the hydrocarbon phase remains dispersed throughout at least a portion of the acid extract phase in the form of a fog of minute droplets of hydrocarbons. This dispersed hydrocarbon raffinate reduces the purity of the tertiary amylenes subsequently recovered from the sulfuric acid extract.

It is an object of this invention to provide a method for accelerating the coalescence of minute droplets of a nonpolar liquid dispersed in a polar liquid. It is also an object of this invention to provide a contact surface which will accelerate the coalescence of minute droplets of a nonpolar liquid dispersed in a polar liquid. Still another object of this invention is to provide a method for accelerating the resolution of an emulsion comprising a liquid hydrocarbon dispersed in a sulfuric acid extract containing tertiary amylenes absorbed therein. Still another object of this invention is to provide a contact surface for accelerating the resolution of an emulsion comprising a hydrocarbon liquid dispersed in a sulfuric acid extract containing tertiary amylenes absorbed therein. Other and further objects and advantages will be apparent to one skilled in this art upon study of this disclosure including the detailed description and the appended drawing wherein:

The sole figure is a schematic representation of the process of the invention.

Referring now to the drawing, a hydrocarbon mixture containing tertiary amylenes and other $C_5$ hydrocarbons is passed to a contactor 10 via conduit 11. Aqueous sulfuric acid having an acid concentration in the range of 50–70 weight percent is passed to contactor 10 via conduit 12. Within contactor 10 the sulfuric acid and hydrocarbon mixture is intimately admixed by a conventional mixing or agitating means 20. The temperature of the contact zone is maintained below 100° F. by a means such as indicated at 13 for indirect heat exchange by means of a cooling fluid circulated through the means 13 or by other methods such as controlling the temperature of the hydrocarbon and the acid feed streams. Sulfuric acid and hydrocarbon feeds are generally passed to contactor 10 at rates so as to maintain a volume percent of sulfuric acid in contactor 10 within the range of 40–70.

A mixture of hydrocarbon and sulfuric acid is withdrawn from contactor 10 via conduit 14 and passed by means of pump 15 and conduit 16 to a separation vessel 17 which is packed with solid polyethylene in particulate form indicated at 18. Rapid coalescence of hydrocarbon droplets is accomplished by contact of the minute hydrocarbon droplets with the polyethylene surface. The mixture in the separation vessel 17 separates into two liquid phases having an interface 19. A hydrocarbon raffinate phase is withdrawn from the upper region of vessel 17 via conduit 21 and the sulfuric acid extract phase containing absorbed tertiary amylenes is withdrawn from the lower region of separation vessel 17 via conduit 22.

It will often be desirable to recycle a portion of the raffinate to the settler and this can be accomplished by returning a stream of raffinate via conduit 23 to conduit 14 so that the recycle raffinate and the mixture of hydrocarbon raffinate and acid extract are mixed in pump 15 prior to entry into settler 17. The amount of raffinate recycled, if any, can be controlled by a valve in line 23. The raffinate recycle is particularly effective in resolving the primary emulsion by inversion of the emulsion produced so as to make the hydrocarbon phase the continuous phase. The emulsion produced in the contactor is one wherein the acid phase is the continuous phase as a result of maintaining the volume percent of sulfuric acid in the liquid mixture in the contactor in the range of about 40 to about 70 percent. Liquid hydrocarbon raffinate is recycled to the settler in an amount sufficient to maintain the volume percent of sulfuric acid in feed stream to the settler below about 30 percent so as to effect inversion of the emulsion.

The secondary fog which persists is comprised of minute droplets of hydrocarbon raffinate dispersed in the acid extract phase. The slow rate at which these droplets separate from the acid phase requires an excessive settling time for their removal and results in contamination of the tertiary amylene product if they are not removed in the separation step practiced in the settling zone.

The following examples will be helpful in understanding the invention but are not to be construed as unduly limiting the invention.

EXAMPLE

A $C_5$ hydrocarbon fraction containing an appreciable amount (20 to 45 weight percent) of tertiary amylenes (2-methylbutene-2 and 2-methylbutene-1) in admixture with 2-pentene, 1-pentene, isopentane and other hydrocarbons having similar boiling points, was passed to a stirred contact zone at the rate illustrated in Table I. Aqueous sulfuric acid having an acid concentration of about 65 weight percent was passed to the stirred contact zone at the rate illustrated in Table I. The temperature of the contact zone was maintained at about 60° F. The effluent from the contact zone was passed to a settling zone 12 inches in diameter and 30 inches in height containing no packing or, as indicated, filled with solid polyethylene pellets ⅛ inch in diameter and ⅛ inch in length. The solid polyethylene was made according to the process described in U.S. Patent 2,825,721, issued Mar. 4, 1958, to J. P. Hogan et al.

The combined mixture passed to the settling zone was permitted to settle into two liquid phases. The settling zone was maintained at a temperature of about 60° F. and a pressure of about 10 p.s.i.g. After an average residence time in the settling zone shown in Table I, the acid phase was withdrawn. The extract was withdrawn at a rate so as to maintain about 80 percent of the free volume of the settler filled with the acid extract phase.

The tertiary amylenes absorbed in the acid extract were recovered by conventional means and were found to have the purity shown in Table I. The purity of the recovered amylenes is the percent of the $C_5$ hydrocarbon fraction, separated from the acid extract, consisting of tertiary amylenes.

TABLE I

| Run No. | Hydrocarbon feed rate, lb./hr. | Packing in settler | Acid extract rate, lb./hr. | Acid extract res. time-min. | Tert.-$C^5$ percent purity |
| --- | --- | --- | --- | --- | --- |
| 1 | 70 | None | 50 | 150 | 91 |
| 2 | 35 | do | 25 | 300 | 91 |
| 3 | 70 | do | 50 | 150 | [1] 94 |
| 4 | 105 | Polyethylene pellets | 120 | 50 | 95-96 |
| 5 | 105 | do | 120 | 50 | 98 |
| 6 | 105 | do | 120 | 50 | 98 |
| 7 | 105 | do | 140 | 40 | 94 |
| 8 | 105 | do | 120 | 50 | 96-97 |

[1] Heated acid extract in settler to about 80–90° F.

The above results show that the purity of the amylene products was appreciably raised when the settler was filled with the polyethylene packing even though the flow rate was increased so that the residence time was decreased. In the above runs no hydrocarbon raffinate was recycled to the settler. It has been shown that a raffinate recycle will increase the purity of the amylene product from 70–75 percent to about 95 percent. The present invention, however, increases the purity of the product to about 98 percent which is a substantial increase.

Runs similar to those above were made with commercially available materials identified as hydrophilic and designed to resolve emulsions by coalescing nonpolar droplets suspended in a polar liquid. These materials proved to be unsatisfactory because the pressure drop through the material was so great that residence time in the settling zone was increased several fold over that required with the polyethylene packing in the settling zone.

The packing employed in the settler can be any of the solid homopolymers of ethylene and propylene and copolymers of ethylene with a 1-olefin having a maximum of 10 to 12 carbon atoms per molecule, which polymer or copolymer is not swollen by hydrocarbons. Such polymers and copolymers are often described as being resinous rather than rubbery. The polymers and copolymers described in U.S. 2,825,721 are particularly preferred for making the packing material of this invention.

The packing material can be fabricated into any suitable shape including rings, pellets, saddles, turnings, chips or strands similar to rock wool or glass wool. It is usually preferred to employ a shape which will provide the maximum surface with the minimum resistance to flow through the mass of packing.

That which is claimed is:

1. A method for separating a liquid hydrocarbon phase dispersed in an aqueous sulfuric acid extract of tertiary amylenes which comprises contacting in a separation zone a dispersion of a liquid hydrocarbon raffinate in an aqueous sulfuric acid extract of tertiary amylenes with a body of discrete particles of solid polyethylene; withdrawing from said separation zone a liquid hydrocarbon raffinate stream; returning to the feed stream to said separation zone an amount of said raffinate sufficient to maintain the sulfuric acid content of the feed stream to said separation zone below about 30 volume percent; and withdrawing from said separation zone an aqueous sulfuric acid extract of tertiary amylenes.

2. A method for resolving an emulsion of a liquid hydrocarbon raffinate dispersed in an aqueous sulfuric acid extract of tertiary amylenes wherein the concentration of the acid is 50 to 70 percent sulfuric acid and wherein the acid comprises 40 to 70 volume percent of the total mixture which method comprises contacting a feed stream of said emulsion, in a separation zone, with a body of discrete particles of solid polyethylene;

withdrawing a stream of said acid extract from a lower portion of said separation zone;

withdrawing a stream of said raffinate from an upper portion of said separation zone; and returning to said feed stream an amount of said raffinate sufficient to maintain the sulfuric acid content of the feed stream to said separation zone below about 30 volume percent.

References Cited by the Examiner

UNITED STATES PATENTS

| | | | |
| --- | --- | --- | --- |
| 2,429,965 | 10/1947 | Shearer et al. | 252—331 |
| 2,449,463 | 9/1948 | Evering et al. | 260—666 |
| 2,493,384 | 1/1950 | Bergen | 260—666 |
| 2,503,014 | 4/1950 | Webber | 252—325 |
| 2,509,885 | 5/1950 | Rupp et al. | 260—677 |
| 2,542,147 | 2/1951 | Krewer et al. | 252—325 X |
| 2,588,639 | 3/1952 | Lee et al. | 260—666 |
| 2,907,717 | 10/1959 | Hann | 252—325 |
| 3,179,603 | 4/1965 | Edwards et al. | 260—677 |

FOREIGN PATENTS 378,658   2/1940   Italy.

DELBERT E. GANTZ, *Primary Examiner.*

ALPHONSO D. SULLIVAN, JOSEPH R. LIBERMAN,
*Examiners.*

C. E. SPRESSER, *Assistant Examiner.*